United States Patent [19]

Ivey

[11] 4,386,922
[45] Jun. 7, 1983

[54] POWER TRANSMISSION CHAIN BELT

[75] Inventor: John S. Ivey, Ithaca, N.Y.

[73] Assignee: Borg-Warner Corporation, Chicago, Ill.

[21] Appl. No.: 346,813

[22] Filed: Feb. 8, 1982

[51] Int. Cl.³ .............................................. F16G 5/16
[52] U.S. Cl. .................................... 474/242; 474/201
[58] Field of Search ............... 474/240, 242, 244, 245, 474/201

[56] References Cited

U.S. PATENT DOCUMENTS

| 2,038,583 | 4/1936 | Maurer | 74/236 |
| 4,313,730 | 2/1982 | Cole, Jr. et al. | 474/201 |

FOREIGN PATENT DOCUMENTS

| 87679 | 3/1922 | Austria | 474/201 |
| 2044311 | 7/1971 | Fed. Rep. of Germany | 474/201 |
| 476518 | 11/1937 | United Kingdom | 474/245 |

Primary Examiner—Lawrence J. Staab
Assistant Examiner—Michael D. Bednarek
Attorney, Agent, or Firm—Aubrey L. Burgess

[57] ABSTRACT

A power transmission chain-belt as disclosed is especially adaptable to transmit power between the pulleys of a pulley transmission, the pulleys of which are each constructed of a pair of flanges. The chain-belt comprises a plurality of sets of interleaved links joined by pivot means, and a set of at least three generally V-shaped or trapezoidal load blocks located between each adjacent pair of pivot means. Each load block has a central opening permitting its assembly with the links, and edge surfaces to drivingly contact the pulley flanges. The central opening of the load blocks has a height greater than the height of the links, so as to define a space therebetween. Resilient means, such as a curved leaf spring, is positioned between each set of links in the space between the chain and the central opening of a set of load blocks to apply a force on the load blocks of each set. The load blocks of a set engage the pulley flanges at different times, both insuring a sharing of the load by all blocks of a set of blocks and also changing the usual pattern of impact noise due to the blocks successively engaging the pulley flanges.

18 Claims, 7 Drawing Figures

U.S. Patent  Jun. 7, 1983  4,386,922
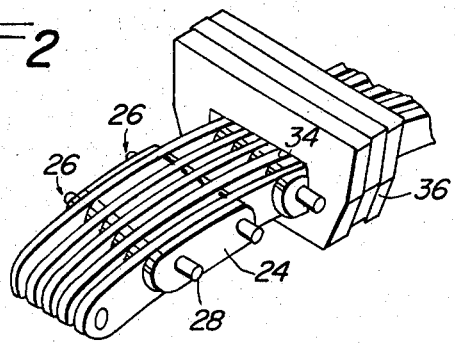
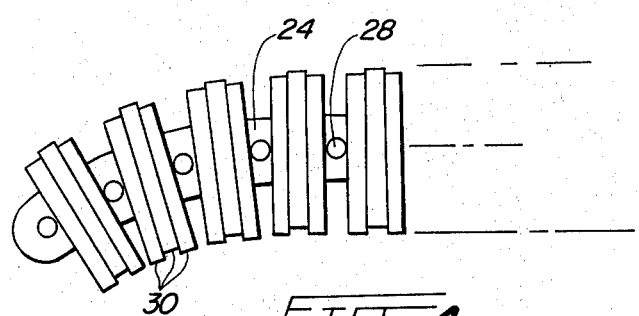
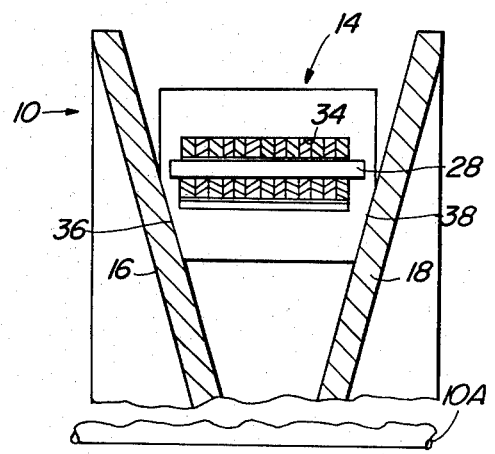
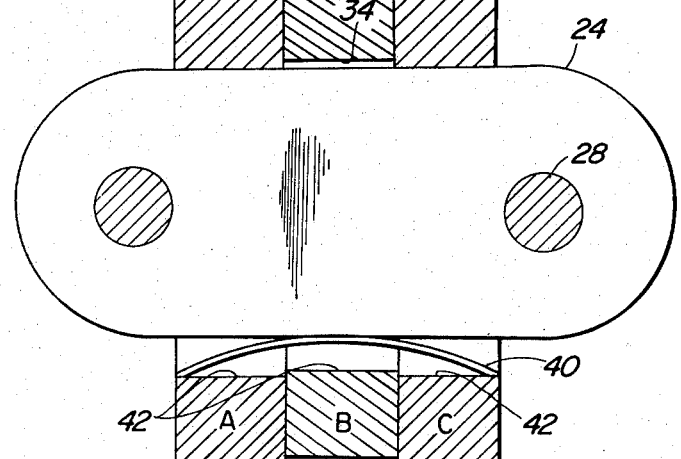
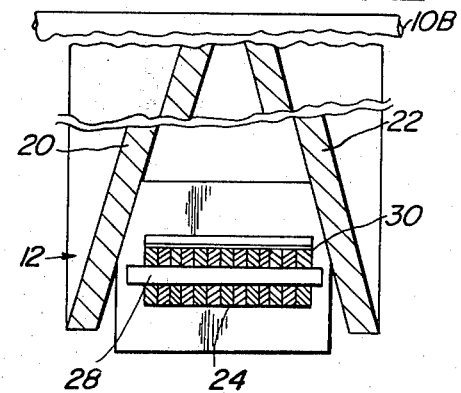
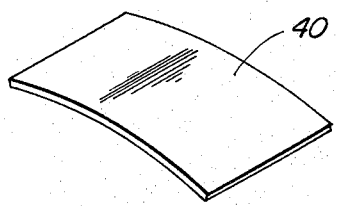
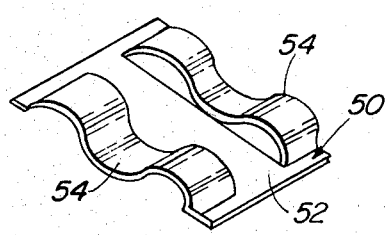
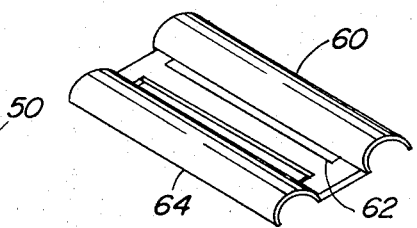

POWER TRANSMISSION CHAIN BELT

BACKGROUND OF THE INVENTION

Variable pulley transmissions comprising a pair of interconnected pulleys mounted on generally parallel shafts with each pulley having at least one of its flanges movable with respect to other flange to change the drive ratio therebetween are well known in the art. For many applications, the pulleys are interconnected by a rubber or other elastomer V-belt. However, for automotive drive applications elastomeric V-belts are not suitable because they are not generally able to handle the torque requirements.

A power transmission belt manufactured by superimposing a plurality of metal bands on one another in a "nested fashion" and providing thereon a plurality of generally V-shaped metal load blocks with angled edges to engage the pulley flanges, has been suggested in van Doorne et al, U.S. Pat. No. 3,720,113. A belt so manufactured is expensive and must be manufactured with close tolerance to properly function.

Chain-belts comprising a plurality of interleaved links joined by pivot means with one or more generally trapezoidal or V-shaped metal load blocks thereon have also been suggested in the co-pending application of Cole et al, U.S. Ser. No. 130,772, filed Mar. 17, 1980, now U.S. Pat. No. 4,313,730. These belts can be manufactured for much less cost than the van Doorne et al belts. However, significant noise levels at frequencies which may be objectionable to the human ear can be generated when the load block of the chain-belt successively engages the pulleys, as will be described. Also, the load may not be shared by all load blocks because of the chordal action of the belt and the pulleys, resulting in an uneven load distribution on the chain.

SUMMARY OF THE INVENTION

A power transmission chain-belt can be constructed, according to this invention, to ameliorate the objectionable noise peaks in the frequency spectrum and to substantially insure load sharing by the load blocks. Such a chain-belt comprises a plurality of pivotably connected sets of interleaved chain links, a plurality of load blocks of special configuration between the pivot means and surrounding the chain, and resilient means between the load blocks and the chain. The adjacent sets of the links are joined by pivot means, such as round pins, or pin-and-rocker joints or the like, which are known in the art. The load blocks surrounding the chain have angled edge surfaces to engage the flanges of the pulleys in a pulley transmission. They are thus generally V-shaped or trapezoidal when viewed from the front and back, and usually constructed of a hardened carbon steel. Preferably a group of three blocks are positioned between two adjacent pivot means throughout the extent of the chain. Unlike load blocks previously suggested, the load blocks used to construct the chain-belt of this invention have enlarged central openings to afford resilient loading of at least one block in a group of blocks.

Because of the structural arrangement, the blocks progressively engage the pulley flanges with differing loads and thus the pattern of impact is different than heretofore encountered for this type of drive. This different impact pattern produces noise peaks which are less objectionable than those generated with earlier arrangements. The arrangement insures that each block shares part of the load as it engages the pulley flanges, and this division of loads after engagement with the pulleys is such as to reduce wear on the blocks. This will be more fully explained in the detailed description of the invention which follows.

BRIEF DESCRIPTION OF THE DRAWING

FIG. 1 is a partial schematic illustration of a typical pulley drive in which the chain-belt of this invention is usable;

FIG. 2 is a perspective view of a portion of a chain-belt according to this invention;

FIG. 3 is a side view, with parts in section, of a portion of a chain-belt constructed according to this invention;

FIG. 4 is a longitudinal cross-sectional view taken through a load block set of a chain as illustrated in FIG. 2;

FIG. 5 is a perspective view of the spring illustrated in FIG. 4;

FIG. 6 is a perspective view of a second form of a spring usable in the chain-belt of FIGS. 3 and 4; and FIG. 7 is a perspective view of still another form of a spring usable in the chain-belt of FIGS. 3 and 4.

DESCRIPTION OF THE PREFERRED EMBODIMENT

FIG. 1 of the drawing illustrates schematically a typical pulley transmission comprising a pair of spaced pulleys 10 and 12, mounted on drive and driven shafts 10A and 10B, respectively, drivingly connected by a chain-belt 14, each pulley comprising a pair of flanges 16, 18 and 20, 22, respectively. The drive shaft 10A is generally connected to a power source (not shown), such as a motor and the driven shaft is generally connected to a means to be driven, (also not shown), as for example to a pair of wheels of an automobile. The transmission can be of the variable type in which at least one flange of each pulley is movable with respect to the other, so that the drive ratio is determined by the spacing of flanges. The chain-belt 14 of this invention is especially adaptable for the variable pulley transmissions although it can be used in any pulley transmission.

As shown in FIG. 2, the chain-belt 14 comprises a plurality of sets or ranks 26 of interleaved links 24, each set being joined to the next adjacent set by a pivot means 28, shown as a round pin. The pivot means may be a pin and rocker joint without departing from the spirit of the invention. A pin and rocker joint comprises a pair of elements, one having a surface in rocking engagement with the corresponding surface of the other. Generally, the links and pivot means are made of hardened carbon steel.

The chain-belt 14 also comprises a plurality of groups of hardened carbon steel load blocks 30 assembled over the sets 26 of links 24 and between the next adjacent pivot arms 28. In the preferred embodiment of the subject invention, each group of blocks comprises at least three blocks, the blocks in FIG. 4 being identified for purposes of explanation as A, B and C. Each load block 30 has a central opening or window 34 with a height greater than that of the links, and sloped or angled edges 36 and 38 (see FIG. 1) for frictionally and drivingly engaging the flanges of the pulleys 10 and 12 in the pulley transmission. The angled edges 36, 38 may have a textured surface or may be coated to enhance the driving engagement with the pulley flanges. The load blocks can be described as of generally V-shaped or trapezoidal shape, when viewed from the front and the back.

An important feature of this invention is a resilient bias means, shown in the first embodiment as a curved leaf spring 40 (see also FIG. 5) located between the links 24 of the chain and the lower surface 42 of the window 34 of the load blocks. Because of the shape of the spring 40, the amount of the bias force on blocks A and C is of a different magnitude than that on block B when the blocks are in the static mode, as shown in FIG. 4.

As recognized in the art, the pitch line of a rigid chain constructed of links and/or sets of links, like the chain formed of the sets of interconnected sets of links 26 of this invention, on its drive sprocket is polygonal rather than circular. This gives rise to what is known as "chordal action," because there is a radial as well as a longitudinal component of motion as the chain wraps the sprocket. The engagement action of a chain is inherently one of impact with the teeth of a sprocket. A similar action occurs when a chain-belt, one constructed of a link chain and load blocks has its blocks engage the flanges of a pulley transmission. The successive impacts produce a noise spectrum with sound peaks in a regular pattern which is objectionable to human ears.

The curved leaf spring 40 is a resilient means which normally holds the blocks A and C in a radially inward position relative to the endless chain-belt and the pulley flanges. As a link set enters the pulley, articulation of the chain-belt permits block A of a group of blocks to initially contact or engage the pulley flanges. The contact force is limited to a value provided by the resilient means, here spring 40. Further articulation of the chain-belt permits block C to engage the pulley flanges and again the force of engagement of block C with the pulley flanges is moderated by the action of the spring. Block B may or may not be in contact with the pulley flanges at this time, and it can carry no radial load until sufficient load is applied to blocks A and C to deflect the spring to a condition where block B reacts on the link-spring interface. Because of the changes in the spring configuration, the spring bias force on block A at its engagement with the pulley flanges is different than that on block C at its engagement; however, all blocks share the load. The first block to engage the pulley flanges is a primary load carrying block, with the spring forcing the other blocks to share the load.

The resultant effect of the spring bias force on the blocks in one group not only provides a load sharing arrangement but also modifies the erstwhile regular impact pattern of the blocks on the flanges, which in turn modifies the sound pattern previously generated by load block-pulley engagement which occurs in the absence of this invention. The impact noise pattern modification results in a chain-belt acceptable for automotive uses.

The resilient means 40 is illustrated in FIG. 5 as a curved leaf spring. This leaf spring could be used in a reverse position, to apply a load to block B in a static condition (see FIG. 4) and no load to blocks A and C. Further modifications in the type of resilient bias means are illustrated in FIGS. 6 and 7. FIG. 6 shows a spring 50 having a body portion 52 and wavy edge portions 54. The body portion can be curved as is spring 40, if desired. The spring 60 of FIG. 7 has a central portion 62 and curved edge portions 64. The same remarks as above with relation to the spring 50, apply here. A resilient member, such as an elastomeric member having the same resiliency or variable resiliency could be used in keeping with the spirit of this invention. However, in the event that a pulley transmission is operated in an oil environment, the elastomeric member should be oil-resilient.

Generally, a group of three load blocks has been found effective to achieve the load sharing and noise reduction advantages of this invention. A group of two load blocks can be used between each pair of adjacent pivot pins, or four or more load blocks can be positioned in each group. Those skilled in the art will appreciate that load-sharing and noise reduction advantages are considered in relation to cost and complexity of assembly as the number of blocks in a group is increased.

I claim:

1. A power transmission chain-belt especially adaptable to transmit power between the pulleys of a pulley transmission, the pulleys of which are constructed of a pair of flanges comprising:
    a plurality of sets of interleaved links;
    a pivot means joining adjacent sets of links to provide a continuous chain;
    a group of at least three generally V-shaped load blocks encircling a set of links and located between two adjacent pivot means;
    said load blocks each having a central window opening permitting the assembly thereof on said chain, and having edge surfaces to drivingly contact the pulley flanges;
    said central window opening of said load blocks having a height greater than the height of said links to define a space therebetween; and
    resilient means positioned in said space between said links and said load blocks of each group, said resilient means being so constructed and arranged to apply a bias force on at least one load block of each group without applying the same bias force to at least another load block of each group.

2. A power transmission chain-belt as recited in claim 1, wherein said resilient means comprises a spring located between the bottom of the links and said load blocks.

3. A power transmission chain-belt as recited in claim 2, in which said spring is curved to apply said force to the outermost load blocks of said group of load blocks.

4. A power transmission chain-belt as recited in claim 3, in which the outermost load blocks of a group have freedom for limited radial movement when said spring applies the force to the outermost load blocks.

5. A power transmission arrangement, comprising spaced pulleys each constructed with a pair of flanges, the flange spacing being variable to change the drive ratio between the pulleys, and a chain-belt drivingly connecting said pulleys, said chain-belt comprising a plurality of sets of links, a plurality of pivot means connecting the sets of links and a group of at least three generally trapezoidal load blocks surrounding each set of links and located between the two adjacent spaced pivot means associated with the set of links, each load block having edge surfaces to drivingly engage the pulley flanges and a central opening having a height dimension greater than the height of said links, said links of each set having upper and lower faces, and resilient means positioned between the lower faces of the links of a set and its associated group of load blocks, said resilient means being so constructed and arranged to apply a force on at least one of said load blocks of said group of load blocks without applying the same force to at least another load block of each group, leaving at least a second one of said load blocks free for limited radial movement during the time the force is applied to said one load block.

6. A power transmission arrangement as recited in claim 5, wherein said resilient means is so constructed and arranged to apply said force to the laterally outermost load blocks of a group, leaving the centermost load block in that group free for limited radial movement during the time the force is applied to the outermost load blocks.

7. A power transmission arrangement as recited in claim 5, in which said resilient means comprises a leaf spring.

8. A power transmission arrangement as recited in claim 6, in which said resilient means comprises a curved leaf spring.

9. A power transmission arrangement as recited in claim 5, in which the force on said load blocks changes as the load blocks progressively engage the pulley flange.

10. A power transmission arrangement as recited in claim 6, in which the force on said load blocks changes as the load blocks progressively engage the pulley flanges, such that the outermost load blocks of a group are loaded before the central load block of said group is loaded.

11. A power transmission arrangement as recited in claim 5, in which said resilient means comprises an elastomeric member.

12. A power transmission chain-belt, comprising an endless array of sets of links, a plurality of pivot means pivotably interconnecting the sets of links into an endless chain, a plurality of groups of generally trapezoidal load blocks, each group being positioned to encircle the chain between adjacent pivot means, said load blocks each having a central window for receiving the links of a set, said window being of a height in excess of the height of said links, and a resilient member located within said central opening and between a portion of said load blocks and said set of links, said resilient member being so constructed and arranged to apply a bias force to at least one load block of each group of load blocks without applying the same bias force to at least another load block of each group of load blocks.

13. A power transmission chain-belt as recited in claim 12, in which a group of load blocks comprises three load blocks.

14. A power transmission chain-belt as recited in claim 13, in which said resilient member comprises a spring.

15. A power transmission chain-belt as recited in claim 14, in which said spring is a shaped leaf spring.

16. A power transmission chain-belt as recited in claim 15, in which said leaf spring is curved and applies said bias force to the outermost blocks of a group of three load blocks.

17. A power transmission chain-belt as recited in claim 13, in which said resilient member is an elastomer member.

18. A power transmission chain-belt as recited in claim 14, in which said spring is a variable rate spring so as to apply different bias forces to the blocks of a group of load blocks.

* * * * *